United States Patent [19]

Fantone

[11] Patent Number: 4,805,971

[45] Date of Patent: Feb. 21, 1989

[54] PERISCOPIC VIEWFINDER

[75] Inventor: Stephen D. Fantone, Lynnfield, Mass.

[73] Assignee: Polaroid Corporation, Cambridge, Mass.

[21] Appl. No.: 87,428

[22] Filed: Aug. 20, 1987

[51] Int. Cl.$^4$ .................. G02B 13/14; G02B 13/18; G02B 23/00

[52] U.S. Cl. ...................... 350/1.2; 350/432; 350/573

[58] Field of Search ............... 350/1.2, 572, 573, 432

[56] References Cited

U.S. PATENT DOCUMENTS

| | | | |
|---|---|---|---|
| 3,583,785 | 6/1971 | Boardman | 350/573 |
| 3,722,979 | 3/1973 | Mikami | 350/561 |
| 3,792,650 | 2/1974 | Mueller et al. | 354/195.13 |
| 4,270,837 | 6/1981 | Baker | 350/572 |
| 4,545,652 | 10/1985 | Hoogland | 350/432 |
| 4,575,195 | 3/1986 | Hoogland | 350/432 |
| 4,621,888 | 11/1986 | Crossland et al. | 350/1.2 |

OTHER PUBLICATIONS

Lens Design Fundamentals by Rudolf Kingslake, Academic Press, New York, San Francisco, London 1978, excerpt pp. 195–196.

Primary Examiner—John K. Corbin
Assistant Examiner—David J. Edmondson
Attorney, Agent, or Firm—Francis J. Caufield

[57] ABSTRACT

An improved periscopic viewfinder for use following an afocal zoom section in a still electronic imaging camera. The viewfinder features an infrared detector for sensing scene intensity to provide strobe quenching information, visual displays, and a relay section comprising a symmetrical pair of new achromats for aberration control and field flattening purposes.

6 Claims, 1 Drawing Sheet

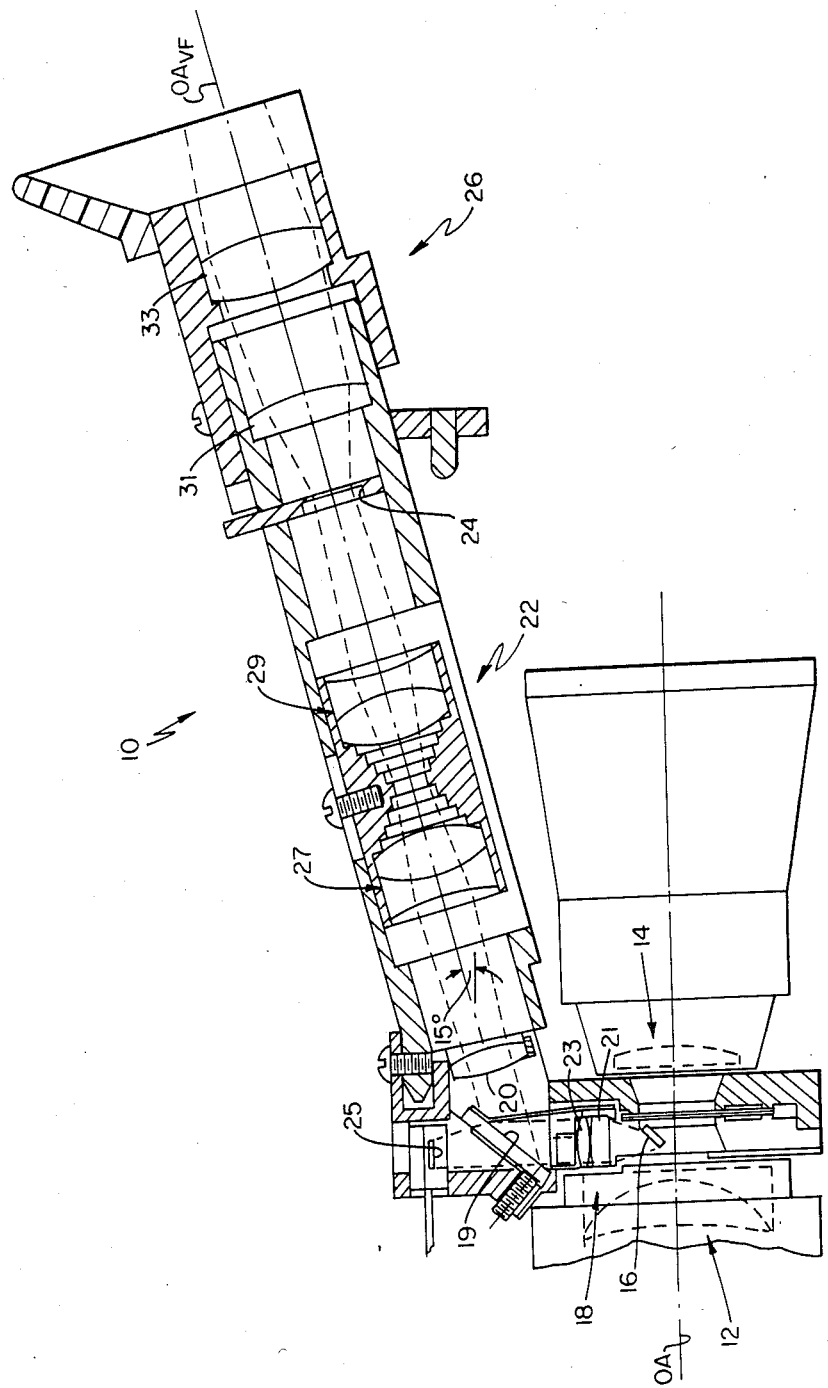

PERISCOPIC VIEWFINDER

BACKGROUND OF THE INVENTION

1. Field of the Invention

This invention in general relates to camera viewfinder systems and in particular, to an improved, periscopic viewfinder system for use with a camera having a zoom lens.

2. Description of the Prior Art

The use of through-the-lens reflex viewfinder arrangements in motion picture, television and other types of cameras is well known. Such arrangements are advantageous because the viewfinder automatically shows the correct field of view irrespective of the focal length of the lens used (especially useful with zoom lenses) and makes visual focusing of the image possible. Commonly, a beamsplitter or small pick-off mirror is positioned in the optical path to direct a percentage of the image forming rays into the viewfinder system which thereafter operates to provide the user with a welldefined, usually rectangular, erect image field more or less equal to that covered by the camera lens.

Generally, such viewfinder arrangements extend along one side of the camera from front to back and, as such, usually comprise a periscopic system which classically consists of an objective, an eyelens or eyepiece and one or more field and erector lenses arranged between the objective and eyelens to extend the length of the system or to erect the image or both.

More recently, perioscopic viewfinder systems have been disclosed which require fewer optical elements than the classical field/relay lens arrangements. The more recent periscopic arrangements eliminate elements by arranging non-spherical elements so that each element performs in part as both objective lens and field lens.

Examples of this more recent type of periscopic viewfinder system are shown, e.g., in U.S. Pat. No. 3,583,785 issued to Jack B. Boardman on June 8, 1971 and entitled "Positive Optical System"; U.S. Pat. No. 3,722,979 issued to Nobunao Mikami on Mar. 27, 1973 and entitled "Optical System of the Real Image Type for Finders Having Aspheric Surfaces"; U.S. Pat. No. 3,792,650 issued to Arthur C. Mueller et al. on Feb. 19, 1974 and entitled "Camera Focus Indicia System"; and U.S. Pat. No. 4,270,837 issued to James G. Baker on June 2, 1981 and entitled "Periscopic Viewfinder System For Use In Photographic Cameras."

It is a primary object of the present invention to provide an improved periscopic viewfinder for use in an electronic imaging camera having a zoom lens.

Other objects of the invention in part will be obvious and in part will appear hereinafter. The invention accordingly comprises the apparatus possessing the construction, combination of elements, and arrangement of parts which are exemplified in the following detailed disclosure.

SUMMARY OF THE INVENTION

The invention is a viewfinder for use in an electronic still camera that has a preceding afocal or nearly afocal zoom lens. The viewfinder itself is an elongated, periscopic type that is folded and comprises a pickoff mirror located near the camera system stop, a two-element objective, a dichroic beamsplitter which reflects visible and transmits infrared, a field lens, a relay, and an eyepiece. Behind the beamsplitter is an infrared photodetector.

The pickoff mirror is in a nearly collimated ray bundle emerging from the zoom and operates to divert part of the light for travel along a folded path to the objective. The objective forms a real image of the scene in a plane in or nearly in the field lens. The real image is relayed by a symmetrical pair of new achromats to an intermediate image location where it is viewable by the eyepiece. The stop of the relay system is imaged onto the pickoff mirror. The new achromats of the relay do not appreciably add to the field curvature introduced by the positive elements leading it, and the entire system includes glass and plastic elements and aspheric surfaces for aberration control.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawing wherein:

FIG. 1 is a side-elevational view of the viewfinder system of the invention.

DETAILED DESCRIPTION

The inventive viewfinder, which is designated generally at 10 in FIG. 1, is intended primarily for use with a still electronic imaging camera of the type having an objective taking lens system which consists of a zoom lens that is partially shown in phantom at 12 followed by a prime lens shown partially in phantom at 14. Zoom lens 12 is afocal or nearly so and, therefore, the bundles of rays from objects emerge from it collimated or nearly so. Consequently, the space between zoom lens 12 and prime lens 14 can be considered collimated space, a factor which allows certain simplifications in the design of viewfinder 10.

The major components of viewfinder 10, which are arranged along a folded optical path, $OA_{vf}$, comprise, as they are encountered by incoming light, a pickoff mirror 16, an objective 18, a dichroic beamsplitter 19, a field lens 20, a relay section 22, a field mask 24, and an eyepiece 26.

Pickoff mirror 16 is the entrance pupil for the viewfinder and is located between zoom lens 12 and prime lens 14 and slightly off optical axis, OA. Pickoff mirror 16, which may be a small prism, serves as the viewfinder entrance window and is positioned slightly offset from the optical axis, OA, being located in the collimated beam which emerges from the rear surface of the last component of zoom lens 12 prior to passage of that beam into and through prime lens 14 which the forms the final image on a photosensor, such as a charge coupled device.

The size of pickoff mirror 16 is small in comparison to the cross-section of the beam which forms the image on the follow on photosensor so that it does not appreciably detract from the available image forming light. The light which it does intercept, it typically reflects through an angle of 90° toward objective 18.

Two lenses make up objective 18. The first of these is designated at 21 and is made of glass, and the other, shown at 23, is plastic and aspheric, preferably fabricated of acrylic. These two lenses are located in the vertically extending space, perpendicular to the taking axis, OA, facing pickoff mirror 16.

The first glass lens 21 is bent around the stop and serves to provide approximately ½ of the refractive power of the viewfinder objective 18. It's of high index to flatten the field as much as possible. The secondary plastic lens 23 adds power, and its aspheric surface corrects for spherical aberration and coma.

From the objective 18, light proceeds nearly vertically and encounters dichroic mirror 19 which reflects visible light and transmits infrared. In the focus of the objective 18 formed on the other side of the dichroic mirror, an IR sensitive detector 25 is placed to provide a measurement of the IR content of the scene as an indication of the scene brightness. With this information, the output of a strobe may be quenched or some other suitable use may be made of it. Here, the size of the IR detector can be used to control the sample taken of the scene - a small detector centerweights while a larger one samples the whole scene.

For the visible light reflected off dichroic mirror 19, an image is formed and, on one or the other side of that image, field lens 20 is placed. However, it is not placed exactly in focus so that defects or dirt which may be on it cannot be seen. Since there have been two reflections to this point, that image is inverted and reverted, i.e., upside-down and backwards.

The real image is then relayed at one-to-one magnification using a symmetrical pair of glass doublets, 27 and 29. Doublets, 27 and 29, have spherical surfaces and are fabricated of glasses chosen so that they are in form "new achromats" which have a significantly flatter field than a conventional doublet. The reason for this use is that, in a relay system like this, negative elements which would normally be used to balance field curvature are inappropriate for other functional reasons.

The traditional achromat uses a low index, low dispersion glass crown with a higher index, high dispersion flint. In these, use is made of a high index, low dispersion crown with a low index, high dispersion flint. Essentially, it is a high index, low dispersion crown with a low index, low dispersion flint. On a glass map, typically the crown is at the low left, and the flint at the upper right. In this case, the crown is at the upper left and the flint at the lower right.

Because of symmetry and the 1:1 magnification, coma, distortion, and lateral color are zero which leaves field curvature, astigmatism and spherical subject to the control of the available parameters. Since the field is flattened as a consequence of the material scheme of the "new achromat", field curvature, astigmatism and spherical are easier to control.

An intermediate image is then formed back in the system where field mask 24 is placed to sharply delimit the field. Displays may be inserted at that point to convey system status and the like to the user. The nominal image size is 4.5 mm × 6 mm for field mask 24.

Eyepiece 26 covers the 4.5 mm × 6 mm format, the displays, and perhaps slightly beyond that area, and it comprises two acrylic lenses derived from a Ramsden form. These are element 31, aspherized for higher performance, which is followed by positive element 33. The bundle of rays emerging from the eyepiece 26 is nearly collimated. An important aspect of eyepiece 26 is that the eye pupil is imaged to the stop between the two doublets, 27 and 29, and then onto pickoff mirror 16. So, several things are relayed here since pupils and the object are being imaged all the way through the viewfinder. Imaging the pupils guarantees that there is no loss of light due to vignetting.

A detailed example of the inventive viewfinder is given by the constructional data in the following table:

| Surface | Radius | Separation Medium | Air | $N_d$ | Material |
|---|---|---|---|---|---|
| Pickoff | | | 3.50 | | |
| 1 | −45.16 | 1.80 | | 1.64 | Schott LAK-21 |
| 2 | −9.38 | | 0.25 | | |
| 3* | 22.15 | 2.00 | | 1.49 | Plexi TM |
| 4 | −11.34 | | 10.58 | | |
| Dichroic Beamsplitter | | | | | |
| 5* | 13.19 | 2.00 | | 1.49 | Plexi TM |
| 6 | −10.00 | | 12.54 | | |
| 7 | 45.59 | 1.60 | | 1.67 | Schott SF-19 |
| 8 | 6.97 | 4.00 | | 1.56 | Schott SK-11 |
| 9 | −10.02 | | 3.78 | | |
| Relay Stop | | | 3.78 | | |
| 10 | 10.02 | 4.00 | | 1.56 | Schott SK-11 |
| 11 | −6.97 | 1.60 | | 1.67 | Schott SF-19 |
| 12 | −45.59 | | 14.65 | | |
| Fieldstop | | | 5.0 | | |
| 13 | 0.00 | 2.50 | | 1.49 | Plexi TM |
| 14* | −15.00 | | 7.11 | | |
| 15 | 20.00 | 4.50 | | 1.49 | Plexi TM |
| 16 | −21.05 | | 20.36 | | |
| Eye Pupil aspheric* | | | | | | in which said surfaces are the surfaces of the viewfinder elements, beginning with the pickoff mirror, in order from object to image space, radii are in mm, $N_d$ is the index of refraction, and wherein surfaces 3, 5, and 14 are aspheric in shape and have the general formula:

$$Y = \frac{CS^2}{1 + \sqrt{1 - C^2S^2}} + \beta S^4 + \tau S^6 + \delta S^8 + \epsilon S^{10} + zS^{12}$$

where C is the reciprocal of the surface apex radius, Y represents the distance of a point on the aspheric surface measured from the surface vertex and parallel to the Y-axis, and S is the radial distance of the point measured perpendicular to the Y-axis and wherein the coefficients with non-zero values are given by the following table:

| | Surface 3 | Surface 5 | Surface 14 |
|---|---|---|---|
| $\beta$ | $5.269 \times 10^{-5}$ | $5.0508 \times 10^{-4}$ | 0.0000 |
| $\tau$ | $-7.96956 \times 10^{-6}$ | | $5.7220 \times 10^{-6}$ |

It will be obvious to those skilled in the art that changes may be made to the above-described embodiments without departing from the scope of the invention. For example, changes in the scale of the example may be effected and slight differences in surface details or materials may be introduced to accommodate variants. In addition, it will be recognized that the use of the viewfinder in collimated or nearly collimated space is not a restriction but rather a simplification since, if the light were not collimated, as zooming took place focus would be less likely maintained. Consequently, where, as here, the viewfinder is not to be separately focused, it is important that it act essentially telescopically, i.e., the light entering and leaving it is essentially collimated. Therefore, it is intended that all matter contained in the above description or the accompanying drawings shall be interpreted as illustrative and not in a limiting sense.

I claim:

1. A periscopic viewfinder for use following an afocal zoom, said periscopic viewfinder comprising:
   a pickoff mirror for intercepting a small bundle of rays emerging from the zoom and reflecting them in a predetermined direction along the viewfinder optical axis;
   an objective lens arranged to intercept the rays reflected from said pickoff mirror and form a real image therefrom, said objective lens comprising a positive glass element followed by an aspheric plastic element having an aspheric surface for correcting for spherical aberrations;
   a field lens positioned more or less at the position of said real image;
   a relay section including a symmetrical pair of new achromats for reimaging said real image to an intermediate location along the optical axis of said viewfinder, said relay section having a central stop located between said symmetrical pair of new achromats and each of said pair of new achromats being bent about said central stop to correct for spherical aberrations;
   a field stop positioned at said intermediate image location; and
   an eyepiece focused more or less on said field stop for viewing said intermediate image.

2. The periscopic viewfinder of claim 1 wherein the optical axis thereof is folded at least once.

3. The periscopic viewfinder of claim 2 wherein said at least one fold in the optical axis of said viewfinder is provided by a dichroic beamsplitter which reflects visible while transmitting infrared.

4. The periscopic viewfinder of claim 3 further including an infrared detector positioned behind said dichroic beamsplitter at the focus of said viewfinder objective for sampling the scene and providing a signal indicative of the intensity thereof.

5. The periscopic viewfinder of claim 1 wherein said eyepiece comprises an asperized plastic element followed by another plastic positive element spaced from it.

6. A periscopic viewfinder for use following an afocal zoom, said periscopic viewfinder having constructional data substantially in accordance with the following table:

| Surface | Radius | Separation Medium | Air | $N_d$ | Material |
|---|---|---|---|---|---|
| Pickoff | | | 3.50 | | |
| 1 | −45.16 | 1.80 | | 1.64 | Schott LAK-21 |
| 2 | −9.38 | | 0.25 | | |
| 3* | 22.15 | 2.00 | | 1.49 | Plexi TM |
| 4 | −11.34 | | 10.58 | | |
| Dichroic Beamsplitter | | | | | |
| 5* | 13.19 | 2.00 | | 1.49 | Plexi TM |
| 6 | −10.00 | | 12.54 | | |
| 7 | 45.59 | 1.60 | | 1.67 | Schott SF-19 |
| 8 | 6.97 | 4.00 | | 1.56 | Schott SK-11 |
| 9 | −10.02 | | 3.78 | | |
| Relay Stop | | | 3.78 | | |
| 10 | 10.02 | 4.00 | | 1.56 | Schott SK-11 |
| 11 | −6.97 | 1.60 | | 1.67 | Schott SF-19 |
| 12 | −45.59 | | 14.65 | | |
| Fieldstop | | | 5.0 | | |
| 13 | 0.00 | 2.50 | | 1.49 | Plexi TM |
| 14* | −15.00 | | 7.11 | | |
| 15 | 20.00 | 4.50 | | 1.49 | Plexi TM |
| 16 | −21.05 | | 20.36 | | |
| Eye Pupil aspheric* | | | | | | in which said surfaces are the surfaces of the viewfinder elements, beginning with the pickoff mirror, in order from object to image space, radii are in mm, $N_d$ is the index of refraction, and wherein surfaces 3, 5, and 14 are aspheric in shape and have the general formula:

$$Y = \frac{CS^2}{1 + \sqrt{1 - C^2S^2}} + \beta S^4 + \tau S^6 + \delta S^8 + \epsilon S^{10} + zS^{12}$$

where C is the reciprocal of the surface apex radius, Y represents the distance of a point on the aspheric surface measured from the surface vertex and parallel to the Y-axis, and S is the radial distance of the point measured perpendicular to the Y-axis and wherein the coefficients with non-zero values are given by the following table

| | Surface 3 | Surface 5 | Surface 14 |
|---|---|---|---|
| $\beta$ | $5.269 \times 10^{-5}$ | $5.0508 \times 10^{-4}$ | 0.0000 |
| $\tau$ | $-7.96956 \times 10^{-6}$ | | $5.7220 \times 10^{-6}$ |

* * * * *